United States Patent
Snible et al.

(10) Patent No.: US 7,502,793 B2
(45) Date of Patent: Mar. 10, 2009

(54) METHOD AND APPARATUS FOR ASSIGNING ROLES TO DEVICES USING PHYSICAL TOKENS

(75) Inventors: Edward C. Snible, New York, NY (US); David Michael Chess, Mohegan Lake, NY (US); Ian Nicholas Whalley, Pawling, NY (US)

(73) Assignee: International Business Machines Corporation, Armonk, NY (US)

( * ) Notice: Subject to any disclaimer, the term of this patent is extended or adjusted under 35 U.S.C. 154(b) by 759 days.

(21) Appl. No.: 10/775,311

(22) Filed: Feb. 10, 2004

(65) Prior Publication Data

US 2005/0198243 A1 Sep. 8, 2005

(51) Int. Cl.
*G06F 17/30* (2006.01)
(52) U.S. Cl. .............................. 707/9; 707/10; 713/155; 709/203
(58) Field of Classification Search ................. 709/203; 707/10, 100, 1, 9; 717/174, 176; 713/155, 713/166, 164, 169, 170, 176
See application file for complete search history.

(56) References Cited

U.S. PATENT DOCUMENTS 6,035,406 A * 3/2000 Moussa et al. ................. 726/18
7,000,015 B2 * 2/2006 Moore et al. ................. 709/224
7,103,771 B2 * 9/2006 Grawrock .................... 713/155
7,106,186 B2 * 9/2006 Cariffe ........................ 340/500
2002/0169967 A1 * 11/2002 Varma et al. ................. 713/185
2003/0115453 A1 * 6/2003 Grawrock .................... 713/155
2003/0163710 A1 * 8/2003 Ortiz et al. ................... 713/186
2004/0083173 A1 * 4/2004 Reddihough et al. .......... 705/41
2005/0081135 A1 * 4/2005 Kindberg et al. ............. 715/500

OTHER PUBLICATIONS

U.S. Appl. No. 09/641,156, Chess et al., Physical Key Security Management Method and Apparatus for Information Systems, filed Aug. 17, 2000.

* cited by examiner

*Primary Examiner*—Cheryl Lewis
(74) *Attorney, Agent, or Firm*—Duke W. Yee; Stephen C. Kaufman; Theodore D. Fay, III

(57) ABSTRACT

A physical token is provided that is used to assign an activity or role to a specific device by virtue of a physical relationship with the device. By associating the token with a device, through electrical connection or by mere proximity relative to the device, an administrator informs the device of the intended role for the device in an enterprise. In conjunction with some bootstrapping or other appropriate software on the computing device, the act of placing the token in the proper physical relationship with the device is all that is necessary to configure and deploy the device in a data center. A device may be assigned roles from a plurality of tokens. Computing devices may also be assigned roles based upon their proximity to other devices. Roles may also include a concept of seniority, wherein one device may be assigned a more senior role to another device.

47 Claims, 5 Drawing Sheets

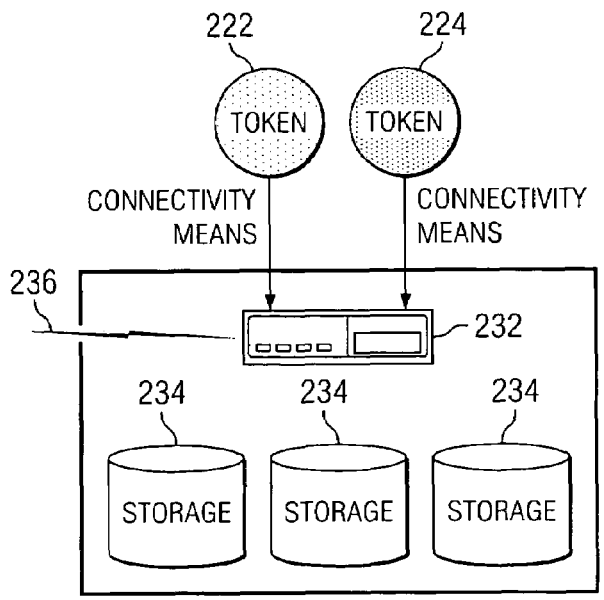
FIG. 2C
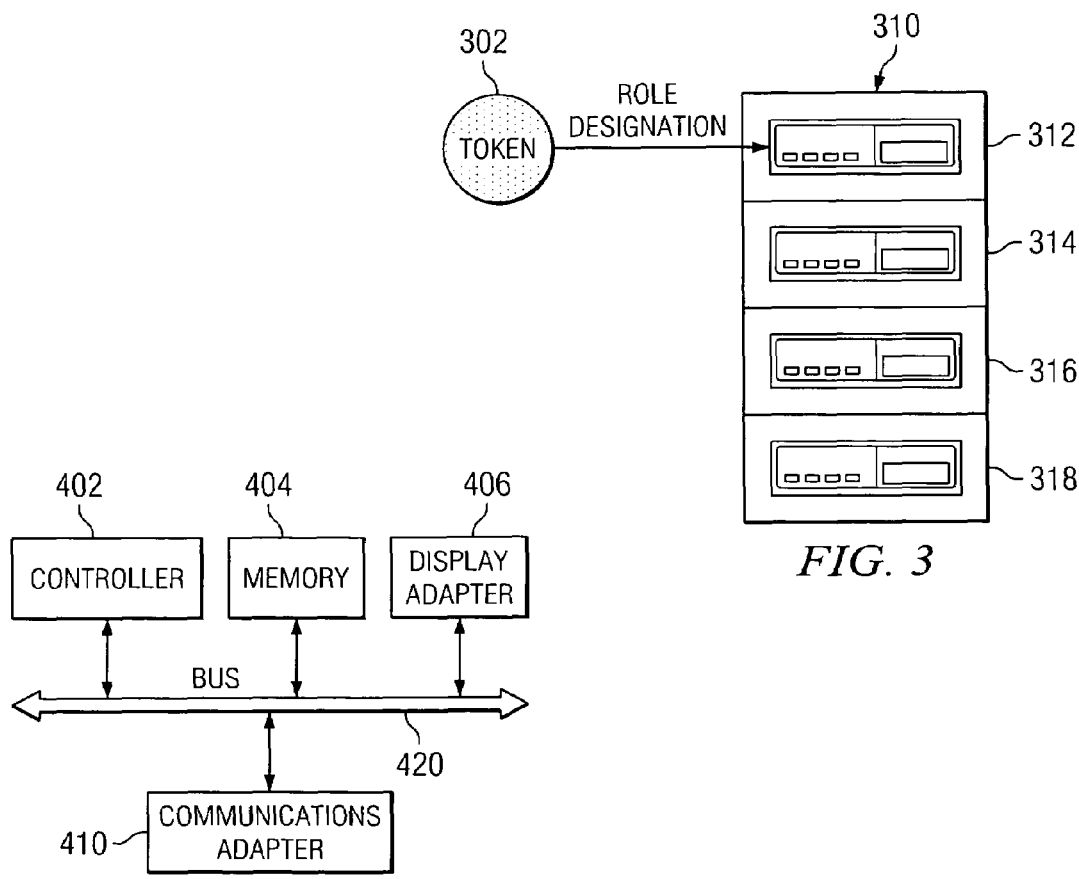
FIG. 3
FIG. 4

METHOD AND APPARATUS FOR ASSIGNING ROLES TO DEVICES USING PHYSICAL TOKENS

BACKGROUND OF THE INVENTION

1. Technical Field

The present invention relates to data processing and, in particular, to autonomic computing. Still more particularly, the present invention provides a method, apparatus, and program for assigning roles to computers using physical tokens.

2. Description of Related Art

When a computer or peripheral is deployed in a data center, it has traditionally been manually configured for a role, e.g. "database server for payroll department," "printer for human resources," or "daily tape backup." Various passive means of device labeling are known to the art, and widely used by system administrators, such as affixing colored adhesive labels to computers, wrapping colored or marked flexible ties around cables, or putting signs atop computer cases. A typical data center contains many servers, peripherals, and other devices, some identical in appearance, providing a variety of different functions. Because system administrators often need to determine the function of a specific device quickly, it is their custom to label devices and cables as a reminder of their function, using marked stickers, colored ties, and other flags. This configuration process is often complex and error-prone, since it is entirely possible for someone to change the function of a device without changing the manual label, resulting in erroneous and sometimes dangerously confusing mislabeling.

Systems are known to the art in which a physical device or badge, such as a smart card or a magnetic card, is used to prove the identity or authorization of the human possessing the device or badge. In some known systems physical objects are used to set the security configuration of computing systems. U.S. patent application Ser. No. 09/641,156 U.S. Pat. No. 7,069,585, to Chess et al., entitled "Physical Key Security Management Method and Apparatus for Information Systems," filed Aug. 17, 2000, introduces a mechanism for security management using physical keys. While this does address one part of the overall issue of the complexity of system configuration, it addresses only security configuration, not role assignment.

Copy-protection devices known as "dongles" are physical objects which, when properly attached to a computer, provide that computer with the information or other means necessary to run certain software. They are used to prevent software piracy by making it difficult to run a program in any computer not equipped with the associated dongle. These systems are used only to deprive a computer of the ability to execute an unlicensed program, not to simplify system configuration or administration, nor to assign a role or priority to a device.

In some small computer system interface (SCSI) device enclosures known to the art, the position in the enclosure of a given SCSI device is used to set the priority in the SCSI chain of the given device. The priority of a device in a SCSI chain, however, is neither indicative of nor responsive to the role that the device plays in the larger computing system of which it is a part, or its relationship with other devices of different types.

SUMMARY OF THE INVENTION

The present invention recognizes the disadvantages of the prior art and provides a physical token that is used to assign an activity or role to a specific device by virtue of a physical relationship with the device. By associating the token with a device, through electrical connection or by mere proximity relative to the device, an administrator informs the device of the intended role for the device in an enterprise. In conjunction with some bootstrapping or other appropriate software on the computing device, the act of placing the token in the proper physical relationship with the device is all that is necessary to configure and deploy the device in a data center. A device may be assigned roles from a plurality of tokens.

According to one aspect of the present invention, a method is provided for assigning a role to a computing device in a network data processing system. The method comprises providing at least a first physical object, wherein the first physical object includes at least one visible characteristic, wherein the first physical object has role information associated therewith, and wherein the at least one visible characteristic is indicative of at least a first role associated with the first physical object, placing at least the first physical object in a physical relationship with a first computing device, associating the first computing device with the first physical object, receiving, by the first computing device, the role information from the first physical object, and responsive to the role information being received, assigning the first role to the first computing device based on the role information.

According to an aspect of the present invention, a computer program product is provided for assigning a role to a computing device in a network data processing system. The computer program product comprises instructions, responsive to at least a first physical object being placed in a physical relationship with at least a first computing device, associating the first computing device with the first physical object, wherein the first physical object includes at least one visible characteristic, wherein the first physical object has role information associated therewith, and wherein the at least one visible characteristic is indicative of at least a first role associated with the first physical object, instructions for receiving, by the first computing device, the role information from the first physical object, and instructions, responsive to the role information being received, for assigning the first role to the first computing device based on the role information.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 2A-2C are diagrams illustrating role assignment using physical tokens in accordance with a preferred embodiment of the present invention;

FIG. 3 is a block diagram illustrating an equipment rack containing a plurality of computing devices in accordance with a preferred embodiment of the present invention;

FIG. 4 is a block diagram illustrating a role assigning token in accordance with a preferred embodiment of the present invention;

DETAILED DESCRIPTION OF THE PREFERRED EMBODIMENT

The present invention provides a label, key, or other physical object to assign an activity or "role" to a computing device by virtue of physical proximity or location relative to the device. A "role" is defined by one or more tasks or functions to be performed by a computing device. For example, a server may be assigned a role of "Web server" or "database server." A printer may be assigned a role of "printer for human resources department." Configuration of hardware, software, and/or operation parameters for a computing device, including installation of new software, depends upon the role assigned to that device. Computing devices may also be assigned roles based upon their proximity to other devices. Roles may also include a concept of seniority, wherein one device may be assigned a more senior role than another device.

By attaching a physical token or "badge" to a computing device, or otherwise putting it into the proper physical relationship with the device, an administrator informs the device of the intended role for the device in the enterprise. In conjunction with some bootstrapping or other appropriate software on the computing device, the act of placing the badge into the proper physical relationship to a device is all that is necessary to configure and deploy that device in a data center. The simplicity of this approach is in sharp contrast with the prior art, which involves complex and error-prone configuration and role-assignment procedures, often involving editing files, and running multiple programs with confusing interfaces.

Figure 1:
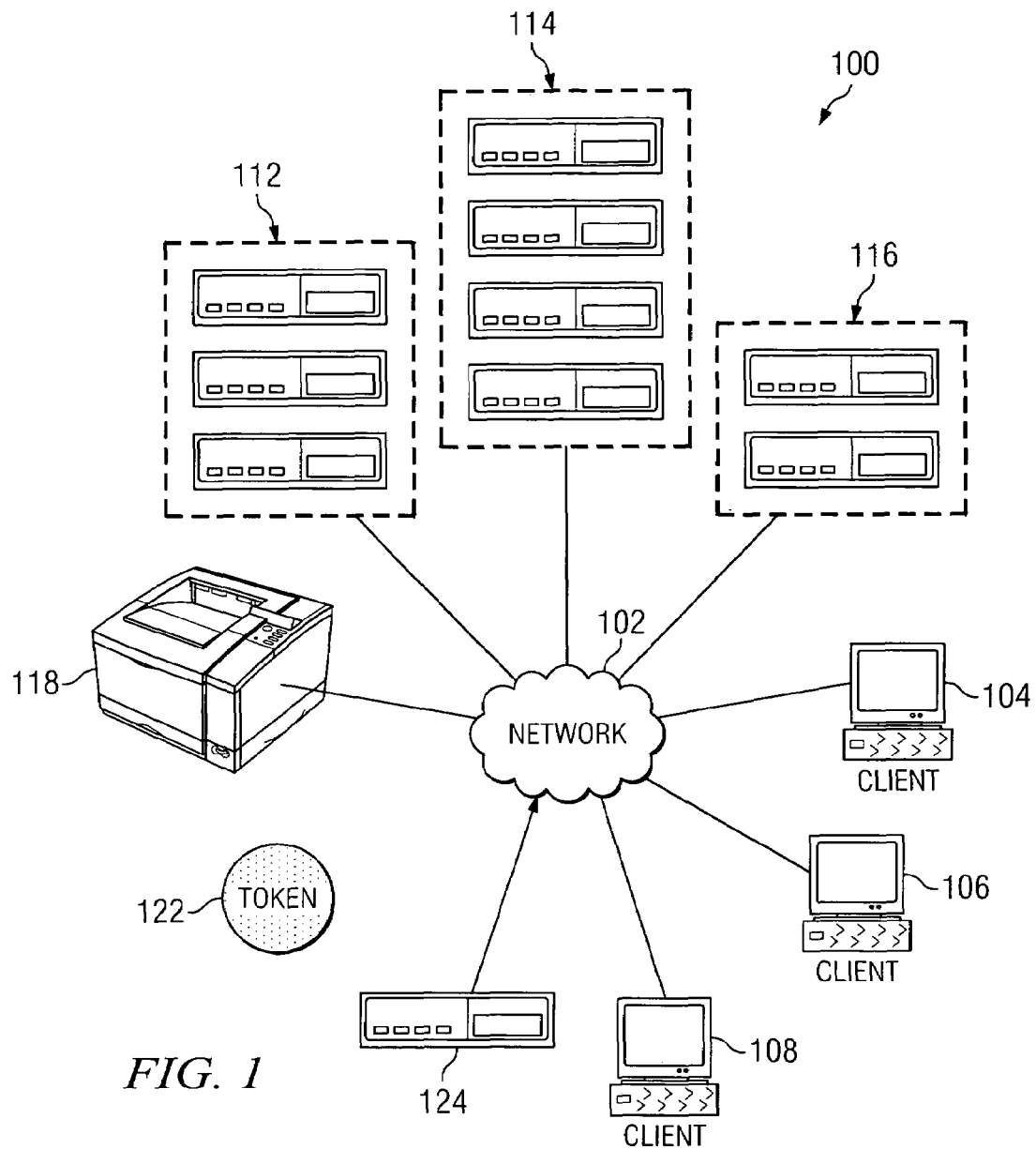
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, servers and other computing devices are connected to network 102. In addition, clients 104, 106, and 108 are connected to network 102. These clients 104, 106, and 108 may be, for example, personal computers or network computers. An enterprise may have many computing devices connected to a network. For example, servers 112 may provide a first service, while servers 114 provide a second service and servers 116 provide a third service. For example, servers 112 may be accounting servers, servers 114 may be Web servers, and servers 116 may be database servers. In the depicted example, servers 112, 114, 116 provide data, services, or applications to clients. Clients 104, 106, and 108 are clients to the servers. Network data processing system 100 may include additional servers, clients, and other devices not shown. For example, printer 118 may be provided for use by particular devices in the network data processing system. For example, printer 118 may be assigned a role of printing billing statements for billing servers, providing printed output for particular clients in the network, or generating dump records for program development.

The various computing devices in the network data processing system have assigned roles. Manual configuration of devices may be a cumbersome and error-prone task. For example, servers 114 may be intended to be Web servers. As such, they may be located in close proximity with one another and labeled accordingly. However, if one of the servers is configured improperly, the labeling is useless. Furthermore, changing the role of a computing device is not an easy task. An administrator must manually uninstall software associated with a previous role, configure the computing device, install software associated with a new role, and label the computing device appropriately.

In accordance with a preferred embodiment of the present invention, computing devices are assigned roles based on a physical object or token. One embodiment of the present invention uses a collection of stickers labeled "database," "web server," "network storage," etc. In addition to providing the traditional function of labels, reminding humans of the purpose and role of an object, the stickers also communicate the intended role to the computer to which they are attached. This communication may include, without limitation, a short range wireless interface, such as Bluetooth.

A second embodiment of the invention is as a set of colored "keys" which are plugged into a peripheral port of a device, for example, without limitation, a universal serial bus (USB) port. As an example, a policy may be written that devices unlocked with a blue key are part of the human resources group, devices with a green key are part of the accounting group, and devices with a gold key are part of the corporate group. This policy, as well as the color(s) of any key(s) currently plugged into the device, is accessible to the software running on the device. The actions a device takes upon entry and exit from a group depends on its self-configuration abilities. The key merely indicates the system administrator's intention.

A computing device with multiple tokens or badges would have more information about the precise role requested. For example, a computer in the appropriate physical relationship to both a "file server" and "human resources" badges would know it is intended to be the file server for the human resources department. A printer with both "media relations" and "vendor relations" badges would consider itself the printer for both departments.

A data center running autonomic systems and communicating with autonomic protocols is capable of provisioning and reprovisioning machines for various roles and workloads. See for instance Jeffrey O. Kephart, David M. Chess: The Vision of Autonomic Computing. IEEE Computer 36(1): 41-50 (2003). In such an environment the present invention takes on a new significance. Acting as a physical token of an administrator's intentions, the tokens, badges, or keys of present invention provide a simple and direct way for humans to provide autonomic systems with hints and behavioral preferences concerning the roles of devices within the autonomic system. That is, in some autonomic embodiments the role communicated by a token to a computing device shall be taken as advisory, as expressing a preference that may be overridden by other considerations, rather than as giving a direct order.

In an exemplary embodiment of the present invention, when a token is removed, the effected device will finish the current workload it assumed under the former role, or hand off the workload to another system which is still functioning under the former role. A token simply tells the computing device an intended role and the computing device performs a self-configuration to perform any assigned roles based upon which tokens are physically associated with the computing device.

Some embodiments of the present invention rely on the physical placement of the device in relation to its peers. In these embodiments, a new device is able to derive its role by examining the roles or other attributes of the devices that are in close proximity. In an exemplary embodiment, the device simply takes on the same role as its neighbors. Other, modified versions of this embodiment have the new device taking on a supporting role, the supporting role selected to provide support for the neighboring devices. In these embodiments, the devices themselves serve as badges relative to their neighbors' roles. That is, a computing device is assigned a role based upon its physical relationship with one or more other computing devices.

In another embodiment of the present invention, there is a concept of seniority within the role groups discussed above. Within the group of machines assigned to a single role, it is, under some circumstances, useful for one of the machines to be designated as the "controller" or "master." This machine is then empowered with the ability to make group-wide decisions, decisions which impact all the machines in the group. One mechanism by which this can be implemented within the realm of this invention is by making one of the tokens in the token group distinct from the others in the group. For example, badges that indicate "rank" may resemble a military chevron insignia. Other physical distinctions may also be used, such as size or the like.

Another embodiment of the seniority determination concept is, again, by physical machine location. For example, the machine that is physically highest—above all the other machines in its group—becomes the most senior. Still other embodiments of the invention allow for finer gradations within a role group. Rather than simply designating a single member of the group as the master, the various devices performing a given role are all at potentially different seniority levels, and those detailed seniority levels impact the manner in which the devices fulfill their roles. For example, seniority levels may influence how conflicts are resolved between devices or how a unit of work is assigned to one of a plurality of available devices.

In accordance with an exemplary embodiment of the present invention, a token or badge may include a display device for providing information about the computing device. The display device may be, for example, a liquid crystal display, a light emitting diode, an active matrix display, or the like. For example, the display may indicate the actual roles being implemented using a text display. One or more colored LEDs may also indicate roles being implemented. As another example, the display device may partially indicate the role as the device is being provisioned or configured. A status bar, blinking light, or the like may indicate the progress of provisioning.

Returning to the example shown in FIG. 1, servers 112, 114, 116 and printer 118 may have physical tokens that assign roles to the respective computing devices. Physical tokens may take the form of stickers, badges, keys, or any other physical device that may be physically associated with and communicate a role to a computing device. Each computing device may have one or more associated tokens. Upon startup, the token communicates a role to the computing device. Using bootstrapping or other appropriate software, the computing device then performs self-configuration to assume the intended role.

The computing devices 112-118 may also be assigned roles based upon their physical association with one another. For example, one of servers within servers 112 may be assigned the role of "billing server" based upon its proximity to the other servers within servers 112. Simply by placing this server within close proximity to the others, the server is assigned a role that is identical to or complementary to its neighbors. In an exemplary embodiment, one of servers 112 has an associated token that assigns roles for the group.

When computing device 124, which may be a server for example, is added to network data processing system 100, a role must be assigned to this device. Token 122 is placed in a physical relationship with device 124. Token 122 has stored therein role information that is communicated to device 124. Thus, if token 122 holds a role of "billing server," device 124 is configured to be a billing server. Similarly, if token 122 holds a role of "file server," device 124 is configured to be a file server. The token may be attached to the device, for example, by an adhesive or other fastening means, as well as by direct connection to a communication adapter in the device. Thus, in order to provision a device within the network data processing system, one need only attach the appropriate token, make the necessary connections, and power on the device. The token also provides the physical clues necessary to determine, by visual inspection, what role is assigned to the associated device.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

The tokens used in this invention can be implemented in a variety of ways—the primary purpose of the invention is, as discussed above, to provide role information to a computing device. This information can be communicated to the computing device in a variety of ways, including, without limitation, wired connectivity and wireless connectivity. Examples of possible wired connectivity means include, without limitation, USB. The token might, for instance, without limitation, take the form of a USB "key" or "pen" of some form. Serial or parallel connections, Ethernet, Firewire, and other types of ports commonly found on current-generation computing hardware may also be used. For example, a device may simply plug into a serial port and rest on top of the device. Other forms of wired connection will be immediately apparent to those skilled in the art, and the range of available connection types is constantly evolving.

Examples of possible wireless connectivity means include, without limitation, Bluetooth, wireless Ethernet standards, infrared (IR), and cell phone-style communications. Wireless Ethernet standers may include, for example, 802.11b, 802.11a, and 802.11g. Other forms of wireless connection will be immediately apparent to those skilled in the art, and the range of available connection types is constantly evolving.

Examples of other possible connectivity means include "tactile" contact and "visual" contact. Tactile contact is where a device might have a physical port that could detect the shape of an inserted badge. Visual contact is where a device might be equipped with a computer-vision system of a type known to the art, and thereby be capable of noting the color, shape, size, or other visible attributes of a badge or token placed in the appropriate physical relationship to the device.

In terms of physical appearance, those of ordinary skill in the art are acquainted with so-called "USB keys" in certain contexts. USB keys are conventionally used as removable storage or as an authentication means for access control. Implementing the invention as such a key has advantages in terms of user familiarity, manufacturability, and so on. The housing of a USB key may also provide the physical clues necessary to communicate assigned roles through visual inspection. For example, a USB key may be a particular color, size, or shape. One may also apply colored bands or other markings to indicate roles associated with a USB key.

In an exemplary embodiment of the present invention, the token is affixed to the device to which it assigns a role by the same mechanism that provides connectivity, for example without limitation, by being affixed to the device's USB port. In another embodiment, the token is an object which is affixed to the device with adhesives known to the art (e.g., a sticker). In yet another embodiment, the token is an object that is placed in a receptacle provided for that purpose on the device or simply placed on top of or somewhat near the device. The badge may also be something that the device is placed in or near, such as, without limitation, a device rack or shelf that informs devices residing upon the rack of their role.

In an exemplary embodiment of the present invention, the computing device determines its physical location relative to other devices. This function may be implemented in several ways. In one such embodiment the devices are able to triangulate with one another to determine their relative positions. In another such embodiment one or more tokens are implemented as racks where devices installed on the rack can obtain their shelf position by methods known to the art. A "rack" is a term of art meaning "computer storage shelving."

In another exemplary embodiment of the present invention, one token may simultaneously provide a role to two or more different devices. For instance, a particular badge might assign roles concerned with providing services to a given department or customer to all devices placed in the same room with the badge. In another such embodiment, a badge placed on a device rack may assign a particular role to all devices in that rack.

In another exemplary embodiment of the present invention, badges are used to provide roles to one or more of a set of devices, and the roles appropriate to one or more of the other devices in the set are inferred from the badge-provided roles using inference rules, policies, or other methods known to the art. For example, a rule may state:

The operator has placed badges in a way that shows a preference for making things triply-redundant. Use that inferred preference when provisioning boxes for which the preference is not known.

In yet another exemplary embodiment of the present invention, servers or other devices provide instructions to human operators that include information or suggestions involving tokens. For example, without limitation, a performance optimization program might advise a human operator that a bank of web servers using the present invention would produce more satisfactory throughput if the red badge, indicating the cluster controller, was moved one machine to the right, or that putting a green key into an additional server would provide a more desirable degree of redundancy. As an example, software may express warnings to the operator as follows:

There is an 86% chance our web servers will overload in five minutes.

There is a 99.9% chance of handling load successfully if two accounting machines are reassigned to be Web servers. (Action will delay morning financial report by twelve seconds.) If you agree with this plan, remove the green key from any two servers.

In an exemplary embodiment of the present invention, once a device has determined the relevant characteristics of the associated badges, the device actually implements the associated role assignments by providing or installing one or more configuration files to one or more pieces of software using methods known to the art. In some such embodiments, those configuration files are obtained or constructed from information at least some of which is obtained from one or more of the badges. For example, without limitation, configuration information may be acquired through the USB port from a USB-attached key or via wireless Ethernet from a wirelessly connected badge.

In yet another exemplary embodiment of the present invention, a device retains the roles assigned to it by a set of badges only as long as those badges remain in the proper physical relationship to the device. In other embodiments, a device retains those roles for some period of time even if the badges cease to be in the proper physical relationship. For instance, a device may retain the role assigned to it by a USB key for a fixed time interval after the key is removed, or a device might retain the role assigned to it by the proximity of a magnetic card until such time as a different magnetic card corresponding to a different role is presented to the device.

In an embodiment of the invention, a device acquires a comparatively small number of bits of data (e.g., from one to twelve) from the associated badge. The data obtained from the badge comprises only enough information to distinguish between a small number of possible general roles, such as, for example, "database," "web server," "storage server," "finance department," "marketing department," "research department," etc. For example, red, blue, and green badges placed so as to be visible to a server's camera might signal the server to take on, respectively, the "database," "web server," and "storage server" roles.

In other embodiments of this invention, a device acquires a comparatively large number of bits of data (e.g., more than 100) from the associated badge. In some such embodiments, the data obtained from the badge is a machine-readable representation of the role that the device should play responsive to the presence of the badge. Such machine-readable representations may be encoded in extensible markup language (XML) or by other syntactic conventions known to the art. Other numbers of bits of data acquired by devices from badges in the present invention will be clear to those skilled in the art.

In an exemplary embodiment of the present invention, the only devices that are responsive to the location and other characteristics of a given badge are the devices whose roles are directly affected by that badge. In an alternative embodiment, other devices are responsive to those characteristics. In some such embodiments, one device is responsible for detecting and determining the characteristics of a badge, those characteristics including which devices' roles the badge should affect, and a different device or set of devices are affected by the badge. For instance, without limitation, a computer with a ceiling-mounted camera in a server room may detect the locations and colors of all badges and devices and communicate the relevant role-assignment information to the other devices in the room using networking means known in the art.

Figure 2A:
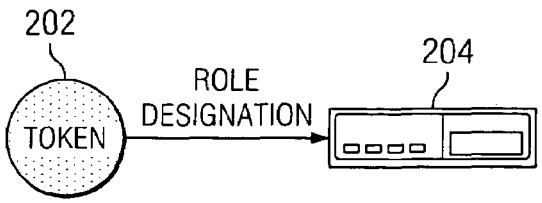
Figure 2B:
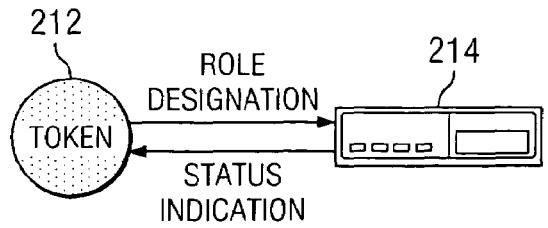

With reference now to FIGS. 2A-2C, diagrams illustrating role assignment using physical tokens are shown in accordance with a preferred embodiment of the present invention. More particularly, with reference to FIG. 2A, token 202 simply contains a role designation which is communicated, via communications means, to computing device 204. The communications means may be any known wired or wireless communications interface, such as USB, Bluetooth, or wireless Ethernet, for example.

Turning to FIG. 2B, token 212 not only uses the communications means to communicate the role designation to device 214, but also to receive from the device indications of the status of device 214 and the units and functionalities associated with the computing device. These status indications may be sent periodically to token 212 or sent whenever the status changes, or in other ways evident to those skilled in the art. The token may then produce a visual, auditory, or other indication of the received status.

FIG. 2C illustrates a connection of tokens 222, 224 to computing device 232 via one or more connectivity means. The computing device 232 may access storage 234, which may include configuration files and software for performing assigned roles. Computing device 232 may also be connected to a network via network connection 236. The computing device may then receive configuration files and software from a device on the network for performing roles, responsive to receiving role designations from tokens 222, 224, and install these files on storage 234. As shown, tokens 222 and 224 may designate different roles and, thus, may have different physical appearance. For example, token 222 may be blue and designate a role of "file server" and token 224 may be orange and designate a role of "human resources."

FIG. 3 is a block diagram illustrating an equipment rack containing a plurality of computing devices in accordance with a preferred embodiment of the present invention. Rack 310 contains computing devices 312-318. Token 302 may be placed in a physical relationship with one of the computing devices, such as device 312. As such, token 302 may designate a role for computing device 312. The remaining computing devices 314-318 may be assigned roles based upon their location relative to computing device 312.

In accordance with a preferred embodiment of the present invention, rack 310 may communicate role designation to the devices. The rack itself may have an associated role such that any computing device placed within rack 310 assumes that role. In an alternative embodiment, the rack may receive role designations from token 302 and assign roles appropriately to computing devices 312-318. The rack may include communication means, such as a small computer system interface (SCSI) bus. Devices may receive their roles through the communication means. In fact, devices may be assigned roles based upon their connection to the communication means.

FIG. 4 is a block diagram illustrating a role assigning token in accordance with a preferred embodiment of the present invention. The elements of the functional block diagram of FIG. 4 may be implemented as hardware, software, or a combination of hardware and software components.

As shown in FIG. 4, the role assigning token includes a controller 402, memory 404, a display adapter 406, and a communications adapter 410. These elements are in communication with one another via the control/data bus 420. Memory 404 may be a random access memory or persistent storage. In an exemplary embodiment, memory 404 is a nonvolatile memory or solid state storage, such as a Flash memory or the like. The communications adapter may be any known type of wired or wireless communications interface. For example, in an exemplary embodiment communications adapter 410 may be a USB communications interface. In another embodiment, communications adapter 410 may also be a Bluetooth wireless communications interface. Although a bus architecture is shown in FIG. 4, the present invention is not limited to such and any architecture allowing for the communication of control messages and data between the elements 402-410 may be used without departing from the spirit and scope of the present invention.

Controller 402 controls the overall operation of the token. The controller may store role assignment information in memory 404. The controller provides the role assignment information to a computing device responsive to the computing device initiating communication with the token through communications adapter 410. Controller 402 may also receive role assignment updates via communications adapter 410.

In addition, the controller 402 may receives status information via the communications adapter 410 and stores the status information in memory 404. Status information may include, for example, information about roles assigned to the device or the progress of configuration and installation of software. Status information may be displayed through display adapter 406, which may include, for example, a liquid crystal display (LCD), light emitting diodes (LEDs), active matrix display, and the like.

Figure 5:
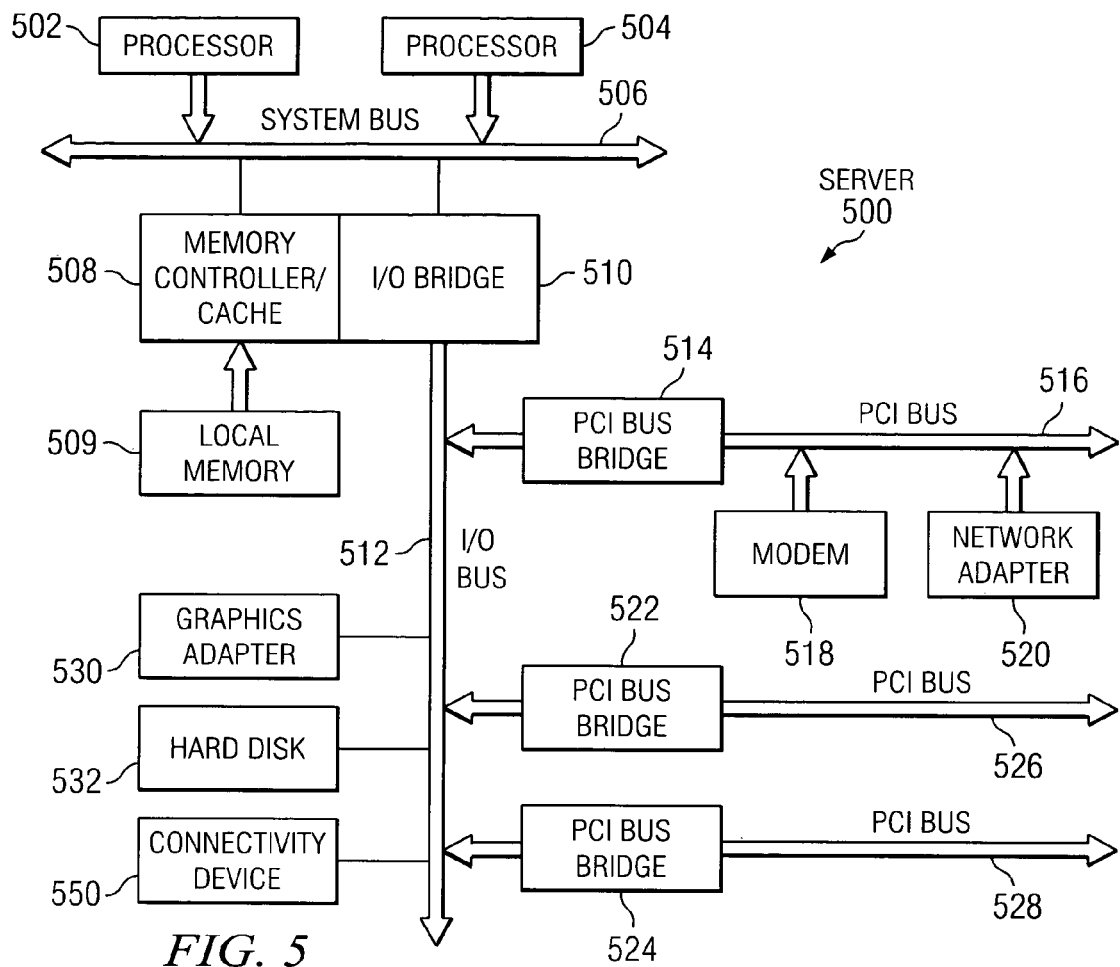
FIG. 5 is a block diagram of a data processing system that may be implemented as a computing device in accordance with a preferred embodiment of the present invention.

Referring to FIG. 5, a block diagram of a data processing system that may be implemented as a computing device, such as server 124 in FIG. 1, is depicted in accordance with a preferred embodiment of the present invention. Data processing system 500 may be a symmetric multiprocessor (SMP) system including a plurality of processors 502 and 504 connected to system bus 506. Alternatively, a single processor system may be employed. Also connected to system bus 506 is memory controller/cache 508, which provides an interface to local memory 509. I/O bus bridge 510 is connected to system bus 506 and provides an interface to I/O bus 512. Memory controller/cache 508 and I/O bus bridge 510 may be integrated as depicted.

Peripheral component interconnect (PCI) bus bridge 514 connected to I/O bus 512 provides an interface to PCI local bus 516. A number of modems may be connected to PCI local bus 516. Typical PCI bus implementations will support four PCI expansion slots or add-in connectors. Communications links to clients and other devices may be provided through modem 518 and network adapter 520 connected to PCI local bus 516 through add-in boards.

Additional PCI bus bridges 522 and 524 provide interfaces for additional PCI local buses 526 and 528, from which additional modems or network adapters may be supported.

In this manner, data processing system 500 allows connections to multiple network computers. A memory-mapped graphics adapter 530 and hard disk 532 may also be connected to I/O bus 512 as depicted, either directly or indirectly.

In accordance with a preferred embodiment of the present invention, data processing system 500 includes connectivity device 550 for providing a communication means for communicating with a token. The connectivity adapter may be any known type of wired or wireless communications interface. For example, in an exemplary embodiment, connectivity device 550 may be a USB communications interface. In another exemplary embodiment, connectivity device 550 may also be a Bluetooth wireless communications interface.

The data processing system depicted in FIG. 5 may be, for example, an IBM eServer pSeries system, a product of International Business Machines Corporation in Armonk, N.Y., running the Advanced Interactive Executive (AIX) operating system or LINUX operating system. However, those of ordinary skill in the art will appreciate that the hardware depicted in FIG. 5 may vary. For example, other peripheral devices, such as optical disk drives and the like, also may be used in addition to or in place of the hardware depicted. The depicted example is not meant to imply architectural limitations with respect to the present invention.

Figure 6A:
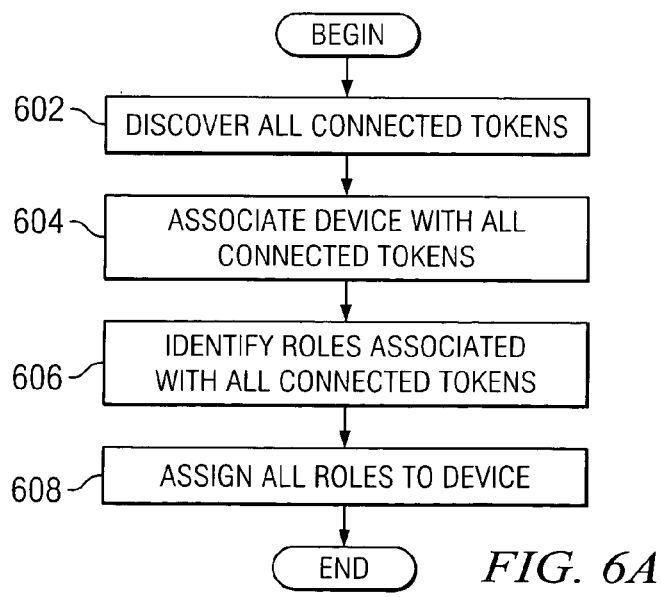
FIGS. 6A-6C are operational flows illustrating role assignment in accordance with a preferred embodiment of the present invention.
Figure 6B:
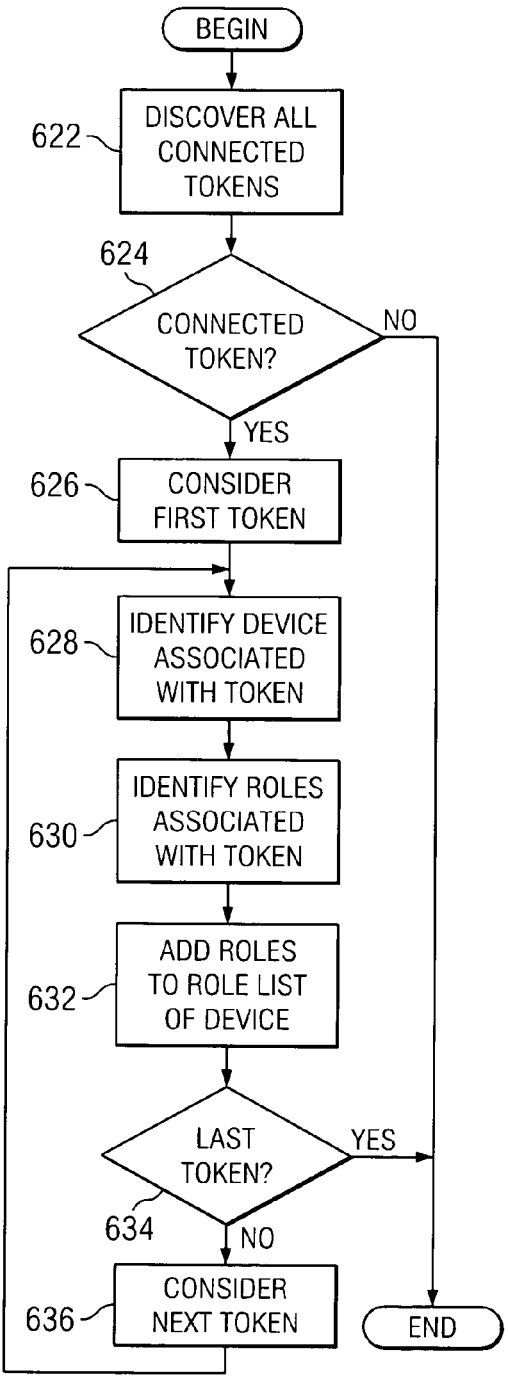
Figure 6C:
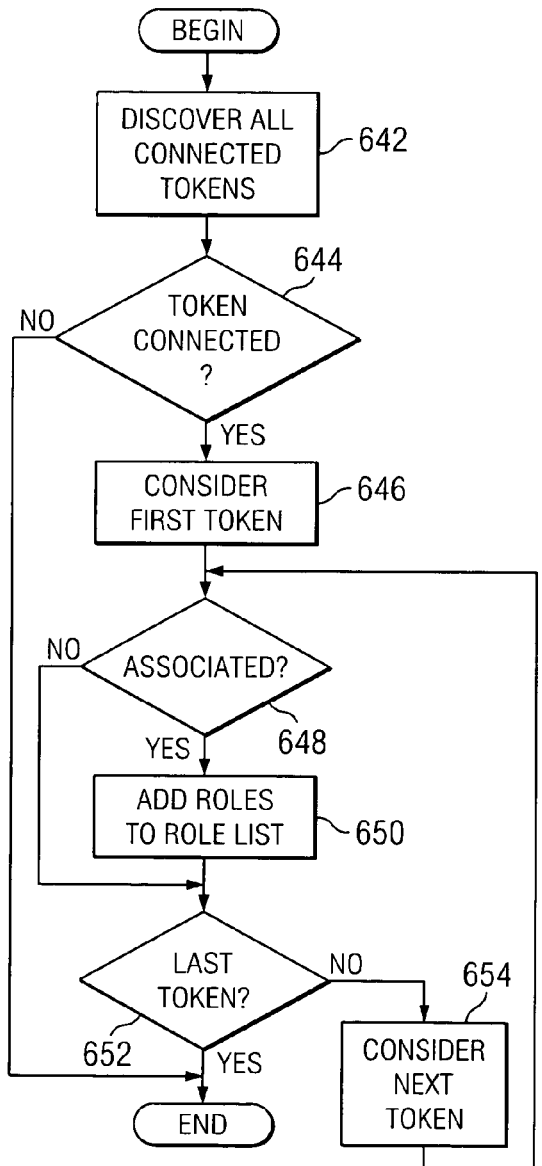

FIGS. 6A-6C are operational flows illustrating role assignment in accordance with a preferred embodiment of the present invention. More particularly, FIG. 6A illustrates the case where a computing device takes on all the roles indicated by all the badges connected to the device. The process begins and discovers all tokens connected to the device (block 602). The process then associates the device with all connected tokens (block 604) and identifies the roles associated with the connected tokens (block 606). Thereafter, the process assigns the roles of the tokens to the computing device (block 608) and ends.

FIG. 6B illustrates the case where it is the job of one or more computing devices to determine which badges and which roles belong to a number of computing devices. For example, one computing device could be responsible for assigning roles to ten other computing devices, based upon which badges are currently present. The computing device responsible for associating roles with devices may or may not be itself included in the set of computing devices to which roles are to be assigned. The process begins and discovers all tokens connected to the computing device (block 622). A determination is made as to whether tokens are connected (block 624). If no tokens are connected, the process ends.

If tokens are connected to the device in block 624, the processor considers the first token (block 626) and identifies the device associated with the token (block 628). The process then identifies the roles associated with the token (block 630) and adds the roles to a role list for the device (block 632). Then, a determination is made as to whether the token is the last discovered token (block 634). If the token is the last discovered token, the process ends. Otherwise, the process considers the next connected token (block 636) and returns to block 628 to identify the device associated with the token. The process of blocks 628-636 is repeated until all tokens are considered. After all connected tokens are considered, the computing device responsible for role assignment assigns the roles to the corresponding computing device.

FIG. 6C illustrates another possible embodiment of the role association process. In this embodiment, there is a plurality of badges connected, via a plurality of communications means, to a plurality of computing devices—and each computing device is itself responsible for determining which, if any, of the available badges with which to become associated. The process begins and discovers all connected tokens (block 642). A determination is made as to whether tokens are connected (block 644). If no tokens are connected, the process ends.

If tokens are connected to the device in block 644, the processor considers the first token (block 646) and a determination is made as to whether the device is associated with the token (block 648). If the device is associated with the token, the process adds the roles of the token to a role list for the device (block 650). Then, a determination is made as to whether the token is the last connected token (block 652). If the device is not associated with the token in block 648, the process continues directly to block 652 to determine whether the token is the last connected token.

If the token is the last token, the process ends. Otherwise, the process considers the next token (block 654) and returns to block 648 to determine whether the device is associated with the next token. The process of blocks 648-654 is repeated until all tokens are considered. After all connected tokens are considered, the computing device assigns the roles in its role list to itself.

Figure 7:
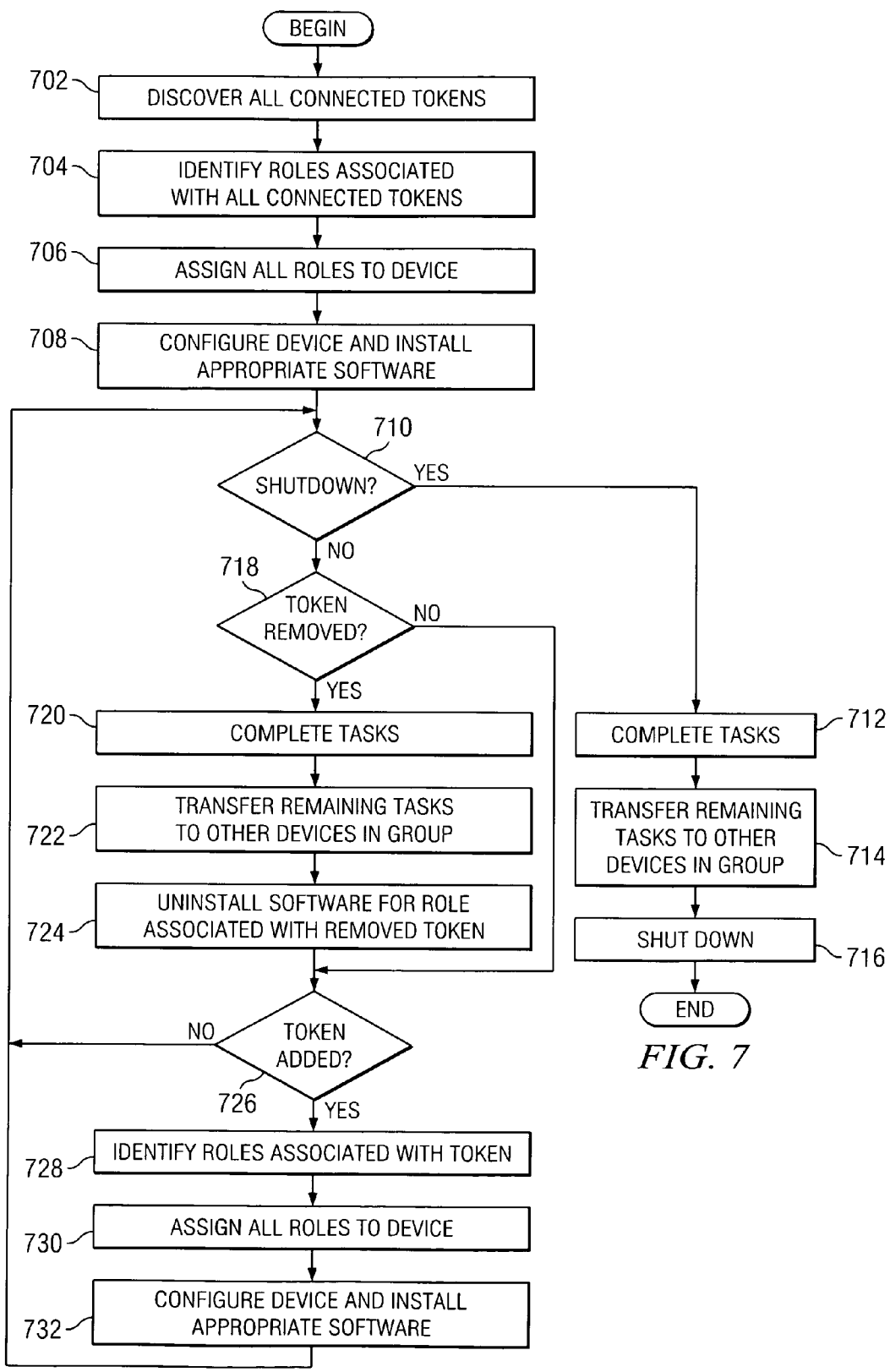
FIG. 7 is a flowchart illustrating the operation of a computing device in accordance with an exemplary embodiment of the present invention.

FIG. 7 is a flowchart illustrating the operation of a computing device in accordance with an exemplary embodiment of the present invention. The process begins and discovers all tokens connected to the computing device (block 702). The process then identifies the roles associated with the connected tokens (block 704) and assigns the roles to the computing device (block 706). Then, the process configures the computing device and installs appropriate software for the assigned roles (block 708).

Thereafter, a determination is made as to whether the computing device is to shut down (block 710). If the computing device is to shut down, the process completes any tasks that are in progress (block 712) and transfers remaining tasks to other devices in the group having the same role, if any (block 714). Then, the process shuts down the device (block 716) and ends.

If the computing device is not to shut down in block 710, a determination is made as to whether a token is removed from the device (block 718). If a token is removed, the process completes any tasks that are in progress (block 720) and transfers remaining tasks to other devices in the group with the same role, if any (block 722). Then, the process uninstalls software for the role associated with the removed token and reconfigures the device (block 724).

If a token is not removed in block 718 or after the software is uninstalled and the device is reconfigured in block 724, a determination is made as to whether a token is added to the computing device (block 726). If a token is added to the computing device, the process identifies roles associated with the added token (block 728) and assigns all roles associated with the token to the computing device (block 730). Then, the process configures the computing device and installs the appropriate software for the newly assigned roles (block 732). Thereafter, the process returns to block 710 to determine whether the computing device is to be shut down.

Thus, the present invention solves the disadvantages of the prior art by providing a physical token that is used to assign an activity or role to a specific device by virtue of a physical relationship with the device. By associating the token with a device, through electrical connection or by mere proximity relative to the device, an administrator informs the device of the intended role for the device in an enterprise. In conjunction with some bootstrapping or other appropriate software on the computing device, the act of placing the token in the proper physical relationship with the device is all that is necessary to configure and deploy the device in a data center. A device may be assigned roles from a plurality of tokens. Computing devices may also be assigned roles based upon their proximity to other devices. Roles may also include a concept of seniority, wherein one device may be assigned a more senior role to another device.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for assigning a role to a computing device in a network data processing system, the method comprising:
    providing at least a first physical token, wherein the first physical token includes at least one visible characteristic, wherein the first physical token has role information associated therewith, and wherein the at least one visible characteristic is indicative of at least a first role associated with the first physical token;
    placing at least the first physical token in a physical relationship with a first computing device;
    associating the first computing device with the first physical token;
    receiving, by the first computing device, the role information from the first physical token;
    responsive to the role information being received, assigning the first role to the first computing device based on the role information; and
    installing, by the computing device, the first role on a storage of the computing device, wherein the first role comprises a number of bits, wherein the number of bits is associated with the first physical token, and wherein the number of bits distinguishes the first role on the computing device.

2. The method of claim 1, wherein receiving the role information from the physical token includes communicating with the physical token through a communications adapter.

3. The method of claim 2, wherein the communications adapter is one of a wireless communications adapter and a wired communications adapter.

4. The method of claim 2, wherein the communications adapter is one of a universal serial bus adapter, a Bluetooth communications adapter, a wireless adapter using 802.11b communications standard, and a wired Ethernet adapter.

5. The method of claim 1, wherein receiving the role information from the first physical token includes identifying the at least one visible characteristic of the physical token.

6. The method of claim 5, wherein the at least one visible characteristic includes one of a shape, a color, writing, and visible markings.

7. The method of claim 1, wherein placing at least the first physical token in a physical relationship with the first computing device includes affixing the first physical token to the first computing device using an adhesive.

8. The method of claim 1, wherein placing at least the first physical token in a physical relationship with the first computing device includes placing the first physical token within a given distance from the first computing device.

9. The method of claim 1, wherein the first physical token is a container and wherein placing at least the first physical token in a physical relationship with the first computing device includes placing the first computing device within the first physical token.

10. The method of claim 9, wherein the container is a computer shelving unit.

11. The method of claim 1, wherein the first physical token is a second computing device and wherein receiving the role information from the first physical token includes identifying a role of the second computing device.

12. The method of claim 1, wherein the first physical token includes a data storage unit and wherein the role information is stored in the data storage unit.

13. The method of claim 1, further comprising:
    providing one or more configuration files to the first computing device to perform the first role.

14. The method of claim 1, further comprising:
    providing one or more software programs to the first computing device to perform the first role.

15. The method of claim 1, further comprising:
    associating the first computing device with a second physical token;
    receiving, by the first computing device, role information from the second physical token; and
    responsive to role information being received from the second physical token, assigning a second role to the first computing device based on the role information received from the second physical token.

16. The method of claim 1, further comprising:
    removing the first physical token such that the first physical token is no longer in a physical relationship with the first computing device;
    disassociating the first computing device from the first physical token; and
    removing the first role from the first computing device.

17. The method of claim 16, wherein removing the first role from the first computing device includes removing the first role from the first computing device after a predetermined period of time expires.

18. The method of claim 16, wherein removing the first role from the first computing device includes removing the first role from the first computing device responsive to a second physical token being placed in a physical relationship with the first computing device.

19. The method of claim 16, wherein removing the first role from the first computing device includes:
    completing all units of work begun while the first role was assigned to the first computing device.

20. The method of claim 16, wherein removing the first role from the first computing device includes:
    passing at least one unit of work begun while the first role was assigned to the first computing device to a second computing device.

21. The method of claim 1, further comprising:
    assigning a seniority level to the first computing device, wherein the first computing device has a more senior role than at least one other computing device.

22. The method of claim 21, wherein assigning a seniority level includes assigning the seniority level based on the role information.

23. The method of claim 21, wherein assigning a seniority level includes assigning the seniority level based upon a physical location of the first computing device relative to the at least one other computing device.

24. The method of claim 1, wherein the first physical token includes an output device.

25. The method of claim 24, further comprising:
    altering the at least one visible characteristic using the output device.

26. The method of claim 24, further comprising:
receiving, by the first physical token, status information from the first computing device; and
presenting an indication of the status information using the output device.

27. The method of claim 1, further comprising:
receiving, by an operator, instructions for assigning roles; and
modifying, by the operator, the physical relationships between physical tokens and computing devices according to the instructions.

28. The method of claim 1, wherein the first computing device assigns at least one role to at least one other computing device based on the role information.

29. The method of claim 1 wherein the number of bits comprises a configuration file for performing the first role.

30. A system for assigning a role to a computing device in a network data processing system, the system comprising:
at least a first computing device;
at least a first physical token, wherein the first physical token includes at least one visible characteristic, wherein the first physical token has role information associated therewith, wherein the at least one visible characteristic is indicative of at least a first role associated with the first physical token, and wherein at least the first physical token is placed in a physical relationship with at least the first computing device;
association means for associating the first computing device with the first physical token;
receipt means for receiving, by the first computing device, the role information from the first physical token;
role assignment means, responsive to the role information being received, for assigning the first role to the first computing device based on the role information; and
installing means for installing, by the computing device, the first role on a storage of the computing device, wherein the first role comprises a number of bits, wherein the number of bits is associated with the first physical token, and wherein the number of bits distinguishes the first role on the computing device.

31. The system of claim 30, wherein the receipt means includes communication means for communicating with the physical token through a communications adapter.

32. The system of claim 31, wherein the communications adapter is one of a wireless communications adapter and a wired communications adapter.

33. The system of claim 31, wherein the communications adapter is one of a universal serial bus adapter, a Bluetooth communications adapter, a wireless adapter using 802.11b communications standard, and a wired Ethernet adapter.

34. The system of claim 30, wherein the receipt means includes means for identifying the at least one visible characteristic of the physical token.

35. The system of claim 34, wherein the at least one visible characteristic includes one of a shape, a color, writing, and visible markings.

36. The system of claim 30, wherein the physical relationship is a given proximity to the first computing device.

37. The system of claim 30, wherein the first physical token is a container and wherein the physical relationship includes placing the first computing device within the first physical token.

38. The system of claim 37, wherein the container is a computer shelving unit.

39. The system of claim 30, wherein the first physical token is a second computing device and wherein the receipt means includes means for identifying a role of the second computing device.

40. The system of claim 30, wherein the first physical token includes a data storage unit and wherein the role information is stored in the data storage unit.

41. The system of claim 30, wherein the first physical token includes an output device.

42. The system of claim 41, wherein the output device is capable of altering the at least one visible characteristic.

43. The system of claim 41, wherein the first physical token receives status information from the first computing device and presents an indication of the status information using the output device.

44. The system of claim 30, wherein the association means and the role assignment means are embodied within the first computing device.

45. The system of claim 30, wherein at least one of the association means and the role assignment means is embodied within a second computing device.

46. The system of claim 30 wherein the number of bits comprises a configuration file for performing the first role.

47. A computer program product for assigning a role to a computing device in a network data processing system, the computer program product comprising:
instructions for, responsive to at least a first physical token being placed in a physical relationship with at least a first computing device, associating the first computing device with the first physical token, wherein the first physical token includes at least one visible characteristic, wherein the first physical token has role information associated therewith, and wherein the at least one visible characteristic is indicative of at least a first role associated with the first physical token;
instructions for receiving, by the first computing device, the role information from the first physical token;
instructions for, responsive to the role information being received, assigning the first role to the first computing device based on the role information; and
instructions for installing, by the computing device, the first role on a storage of the computing device, wherein the first role comprises a number of bits, wherein the number of bits is associated with the first physical token, and wherein the number of bits distinguishes the first role on the computing device.

* * * * *